Oct. 30, 1951   J. H. McFARLAND   2,573,475
STEERING WHEEL
Filed March 25, 1950
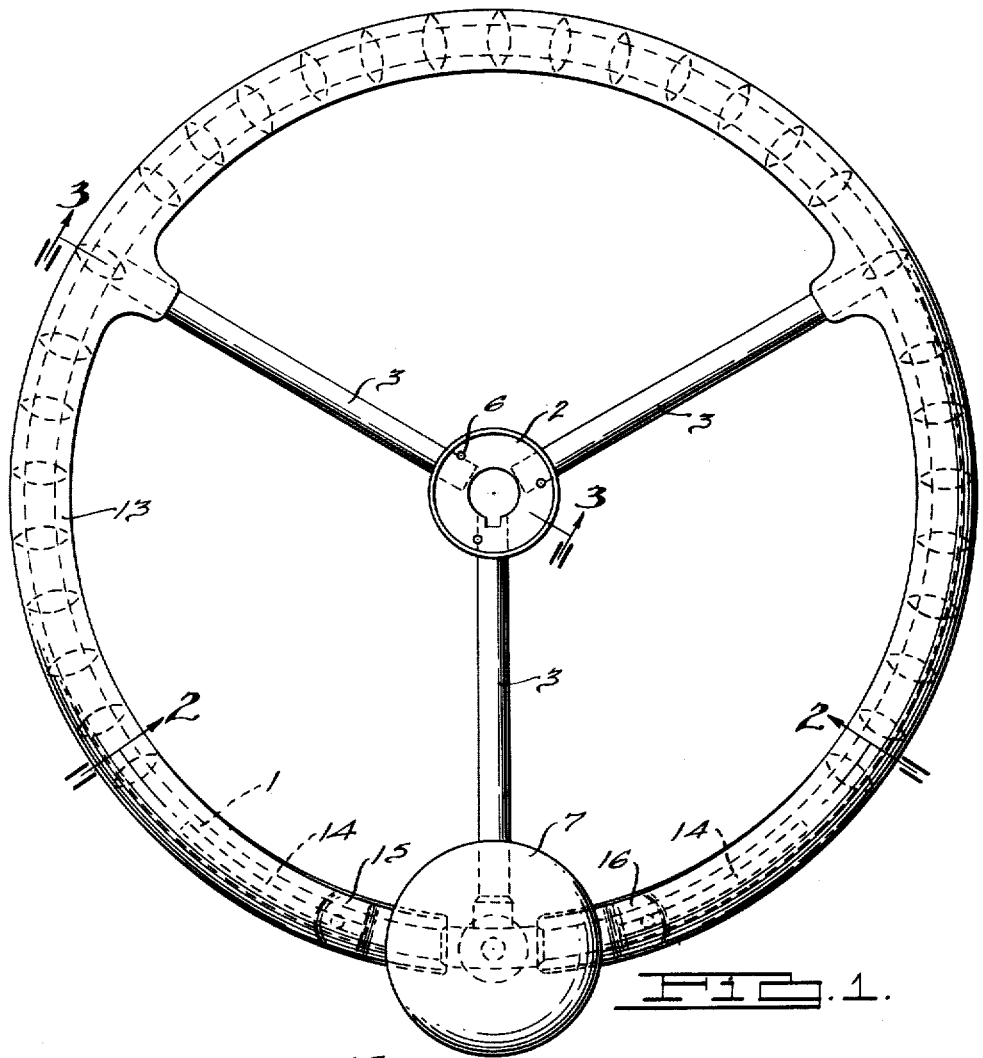
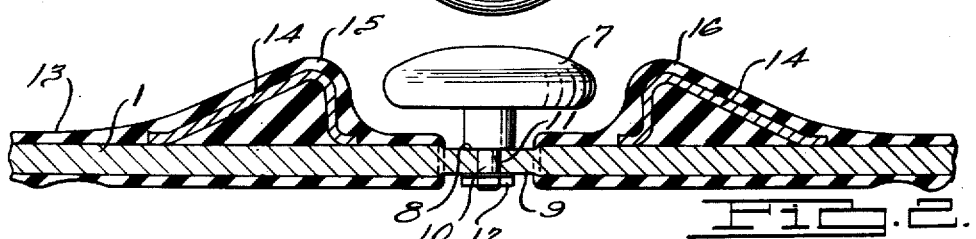
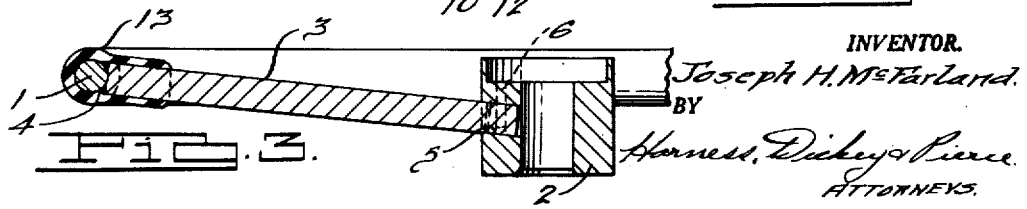
INVENTOR.
Joseph H. McFarland
BY
Harness, Dickey & Pierce
ATTORNEYS.

UNITED STATES PATENT OFFICE 2,573,475

STEERING WHEEL

Joseph H. McFarland, Portland, Ind., assignor to Sheller Manufacturing Corporation, Portland, Ind., a corporation of Indiana Application March 25, 1950, Serial No. 151,898

5 Claims. (Cl. 74—552)

The present invention relates to improvements in vehicle steering wheels.

In vehicle steering wheels, particularly of the type employed with industrial trucks and tractors, finger or hand grips are often employed on the rim of the steering wheel. Such grips are in the form of a rotatable knob which is mounted to the top of the steering wheel rim and project therefrom so that by grasping the knob the operator may quickly turn the steering wheel. Upon release of the knob, the steering wheel spins as the wheels straighten and, in spinning, the projecting finger or hand grip creates a dangerous condition. The operator is in danger of injury, and such injuries have resulted from the projecting knob striking the arm of the operator, resulting in fractures, or other injury, to the operator.

According to the present invention, the rim of the wheel lies in a single plane, that is, there is no depression within which the hand grip is mounted so that the operator's arm cannot be caught in a depression of the rim. Deflectors are provided on the rim adjacent to and on opposite sides of the hand grip so that there is space between the grip and the adjacent sides of the deflectors for hand engagement, but not sufficient space for an arm to drop down into a depression. The opposite sides of the deflectors gradually slope outwardly and toward the hand grip. Thus, upon release of the hand grip and the consequent spinning of the steering wheel, the deflectors would serve to move the operator's arm away from the projecting knob and out of its way so that injury will not result.

One of the primary objects of the present invention is to provide improvements in steering wheels of the type mentioned which provide for safety in operation.

Other objects of the invention will become apparent from the following specification, the drawing relating thereto, and from the claims hereinafter set forth.

In the drawing, in which like numerals are used to designate like parts in the several views throughout:

Figure 1 is a plan view of a steering wheel embodying features of the present invention;

Fig. 2 is a partial cross-sectional view taken substantially along the line 2—2 of Fig. 1; and Fig. 3 is a cross-sectional view taken substantially along the line 3—3 of Fig. 1.

Referring to the drawing, a metal steering wheel insert assembly is illustrated which comprises an annular metal rim 1, preferably formed of circular bar stock. The rim 1 lies in a flat plane; that is, there are no depressions out of the plane in the contour of the rim. The rim 1 is connected to a central hub member 2, preferably in the manner described in McFarland Patent No. 2,304,945, granted December 15, 1942. The connection between the hub 2 and the rim 1 is effected by a plurality of spokes 3 which are formed of circular bar stock. The outer ends of the spokes 13 are welded to the rim 1, as indicated at 4.

The inner ends of the spokes 3 are received within apertures 5 formed in the hub 2 and are secured thereto by means of dowels or pins 6 as described in the patent above referred to.

A portion of the rim 1 is adapted to have mounted thereon a finger or hand grip 7. Such portion of the rim is preferably flattened on top and bottom, as indicated at 8 and 9, and the hand grip 7 is in the form of a knob. The knob 10 is mounted on a shaft which rests upon the top of flattened surface 8 for rotation thereon, and has a reduced shaft portion 10 which projects through an opening 11 in the rim. The knob 7 may be held against axial displacement by means of a lock nut 12, or the like.

It will be appreciated that with the knob projecting from the top surface of the rim 1, without any protection, and upon spinning of the wheel, the operator would be in danger of having his arm struck by the knob 7 as the wheel spins.

The rim 28 is covered with a suitable material, such as one of the plastics, or rubber, as indicated at 13, and the cover 13 also covers frame elements which are mounted on the rim and shaped to provide, with the covering, deflectors adjacent the hand grip 7.

Such frame members or reenforcement members are indicated at 14, and are in the form of rods having end portions welded to the top surface of the rod 1, with the major portion of each member 14 sloping outwardly and toward the knob 7, and then returning toward the rim 1 so as to provide, in effect, a well within which the knob 7 is received. The members 14 covered by the covering material 13 thus provide deflectors 15 and 16 which are disposed on opposite sides of the knob 7, and which project in the same direction. The height of the deflectors 15 and 16 is substantially the same as the projecting height of the hand grip 7 so that, upon spinning of the steering wheel in either direction, an arm of the operator, if it happened to be in the path of the knob 7, would be deflected away from the knob 7 without injury to the operator. The sloping surfaces are significant in that they effect deflection of the arm injury, and permit the knob 7 to pass under the arm without injury. In either direction of rotation of the wheel, there are no sharp or straight abutments which would strike the operator's arm upon spinning of the wheel.

Formal changes may be made in the specific embodiment of the invention described without departing from the spirit of the invention, the scope of which is commensurate with the appended claims.

What is claimed is:

1. A steering wheel comprising a rim lying in a plane, a finger grip mounted thereon and projecting therefrom substantially normal to said plane, and a deflector on said rim adjacent said finger grip projecting from said rim in the same direction as said finger grip, said deflector having a surface sloping upwardly toward said finger grip.

2. A steering wheel comprising a rim lying in a plane, a finger grip mounted thereon and projecting therefrom, and a deflector on said rim adjacent said finger grip projecting from said rim in the same direction as said finger grip, said deflector having a surface sloping away from the plane of the rim and toward said finger grip.

3. A steering wheel comprising a rim lying in a plane, a finger grip mounted thereon and projecting therefrom substantially normal to said plane, and deflectors on said rim adjacent to and on opposite sides of said finger grip projecting from said rim in the same direction as said finger grip, each of said deflectors having a surface sloping upwardly toward said finger grip.

4. A steering wheel comprising a rim lying in a plane, said rim having a flat portion and an opening therethrough adapted to mount a finger grip, and a projecting deflector on said rim adjacent said flat portion, said deflector having a surface sloping outwardly away from the plane of the rim and toward said flat portion.

5. A steering wheel comprising a rim lying in a plane, said rim being of substantially uniform thickness throughout the major portion of its circumference, said rim having a minor portion adapted to mount a finger grip, and projecting deflectors on the remaining portion of the circumference of said rim adjacent to and on opposite sides of said minor portion, each of said deflectors being of greater thickness than said thickness throughout the major portion of the circumference and having a surface sloping away from the plane of the rim and toward said minor portion.

JOSEPH H. McFARLAND.

REFERENCES CITED

The following references are of record in the file of this patent:

UNITED STATES PATENTS

| Number | Name | Date |
| --- | --- | --- |
| 1,936,037 | Webb | Nov. 21, 1933 |
| 1,984,293 | Webb | Dec. 11, 1934 |

Certificate of Correction

Patent No. 2,573,475 October 30, 1951

JOSEPH H. McFARLAND

It is hereby certified that error appears in the printed specification of the above numbered patent requiring correction as follows:

Column 4, line 9, strike out "outwardly";

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*